US010279397B1

(12) United States Patent
Musallam et al.

(10) Patent No.: US 10,279,397 B1
(45) Date of Patent: May 7, 2019

(54) BLIND HOLE LOCATING SYSTEMS, DEVICES, AND METHODS

(71) Applicant: SYMTECH INDUSTRIAL, LLC, Tucson, AZ (US)

(72) Inventors: Rafat Musallam, Tucson, AZ (US); Jeffrey Sorrentino, Tucson, AZ (US)

(73) Assignee: SYMTECH INDUSTRIAL, LLC, Tucson, AZ (US)

( * ) Notice: Subject to any disclaimer, the term of this patent is extended or adjusted under 35 U.S.C. 154(b) by 0 days.

(21) Appl. No.: 16/213,427

(22) Filed: Dec. 7, 2018

Related U.S. Application Data

(60) Provisional application No. 62/688,688, filed on Jun. 22, 2018.

(51) Int. Cl.
*B23B 47/28* (2006.01)
*G01B 5/25* (2006.01)

(52) U.S. Cl.
CPC .............. *B23B 47/287* (2013.01); *G01B 5/25* (2013.01)

(58) Field of Classification Search
CPC .......... B23B 47/287; B23B 47/28; G01B 5/25
USPC ................................ 33/574, 1 CC, 520, 644
See application file for complete search history.

(56) References Cited

U.S. PATENT DOCUMENTS

| 2,408,595 | A | * | 10/1946 | Beard | ...................... | B23B 49/02 33/578 |
| 2,430,025 | A | * | 11/1947 | Mattias | ................... | B23B 47/28 408/241 G |
| 3,026,621 | A | * | 3/1962 | Papps | ...................... | G01B 5/14 33/520 |
| 4,601,618 | A | * | 7/1986 | McEldowney | ......... | B23B 47/28 408/1 R |
| 5,042,166 | A | * | 8/1991 | Arnold | ............... | A44B 17/0005 114/361 |
| 5,175,940 | A | * | 1/1993 | Naill | ....................... | E04D 15/04 33/666 |
| 5,711,082 | A | * | 1/1998 | Olivo | ....................... | B25H 7/00 33/528 |
| 6,427,356 | B1 | * | 8/2002 | Schamal | .............. | G01B 5/0025 33/520 |
| 7,226,032 | B2 | * | 6/2007 | Schlais | ................... | A47G 1/205 248/466 |
| 7,329,076 | B2 | * | 2/2008 | Hartney | ................ | F16B 39/028 33/520 |
| 8,225,522 | B2 | * | 7/2012 | Prior | ........................ | G01B 3/20 33/520 |

(Continued)

*Primary Examiner* — Christopher W Fulton
(74) *Attorney, Agent, or Firm* — Gavin J. Milczarek-Desai; Quarles & Brady LLP

(57) ABSTRACT

Blind hole locating systems, devices, and methods are provided. A method includes installing a guide screw into a blind hole of a first material and assembling a drill guide apparatus, which includes removably coupling a drill guide to a guide strap and inserting a guide pin through a drill guide hole of the drill guide so that a length of the guide pin protrudes past the guide strap. The method also includes placing the drill guide apparatus on the first material so that a portion of a length of the guide pin protrudes into the guide screw, securing a portion of the guide strap to the first material, and removing the guide pin while the guide strap remains secured and placing a second material over the blind hole (including the guide screw in the blind hole) and between the guide strap and the first material.

20 Claims, 2 Drawing Sheets

(56) References Cited

U.S. PATENT DOCUMENTS 8,297,891 B2 * 10/2012 Collado Briceno .... B23B 47/28
                                                      408/115 R
8,387,267 B1 *  3/2013 Ruhoff ................... G01B 5/00
                                                      33/613

* cited by examiner

BLIND HOLE LOCATING SYSTEMS, DEVICES, AND METHODS

CROSS-REFERENCE TO RELATED APPLICATIONS

This application claims priority to U.S. Provisional Patent Application Ser. No. 62/688,688 filed on Jun. 22, 2018, the entire contents of which are hereby incorporated by reference.

BACKGROUND

The present disclosure relates to blind hole locating and drilling systems, devices, and methods.

A blind hole can be defined as a hole that is hidden by a material covering the hole. For example, a top or upper-layer material may lie over and hide a blind hole located in a bottom or lower-layer material. To precisely drill through the top material and into the blind hole, the blind hole in the bottom or lower-layer material must first be located. Various devices exist to assist in locating such blind holes.

Existing blind hole locating devices typically have multiple plates, arms, jaws, or legs arranged above and below the top and bottom materials. This sandwich configuration requires multiple parts to be moved and realigned. The thickness of materials and the location of blind hole(s) relative to an edge of the materials affects the accuracy and precision of such devices. If the materials are too thick, such devices cannot be used at all because it is impossible to create a gap to slide them under. Existing devices are therefore time consuming, imprecise, and impractical for use with a variety of material sizes.

Improved blind hole locating systems, devices, and methods are accordingly needed.

SUMMARY

According to one embodiment of the disclosure, a blind hole locating method includes installing a guide screw into the blind hole of a first material and assembling a drill guide apparatus. The assembling includes coupling a drill guide to a guide strap and inserting a guide pin through a drill guide hole of the drill guide so that a length of the guide pin protrudes past the guide strap. The method further includes placing the drill guide apparatus on the first material so that at least a portion of the length of the guide pin protrudes into the guide screw, securing a portion of the guide strap to the first material, and removing the guide pin while the guide strap remains secured. The method further includes placing a second material over the blind hole (including the guide screw in the blind hole) and between the guide strap and the first material.

According to another embodiment, a blind hole locating device includes a guide screw, a guide strap, a drill guide and guide pin. The guide screw has a diameter sized for insertion into a blind hole of a material and defines a guide screw opening. The guide strap defines a guide strap opening and the drill guide is structured to be removably coupled to the guide strap. The drill guide defines a drill guide hole that is arranged such that, when the drill guide is coupled to the guide strap, the drill guide hole is aligned with the guide strap opening. The guide pin has a diameter sized to be insertable through the drill guide hole and the guide strap opening, and has a length such that, when the drill guide is coupled to the guide strap and the guide pin is inserted through the drill guide hole and the guide strap opening, the guide pin extends into the guide screw opening.

DETAILED DESCRIPTION OF THE DISCLOSURE

The present disclosure provides systems, devices, and methods for locating and drilling blind holes with precision. For example, when a blind hole located in a first material needs to be covered by a second material, the present disclosure allows a user to precisely locate the blind hole in the first material, so that a drill hole can be made through the second material that is precisely aligned with or centered over the blind hole in the first material. A user can then place a fastener through the newly drilled hole in the second material, thereby securing the second material to the first material.

Figure 1:
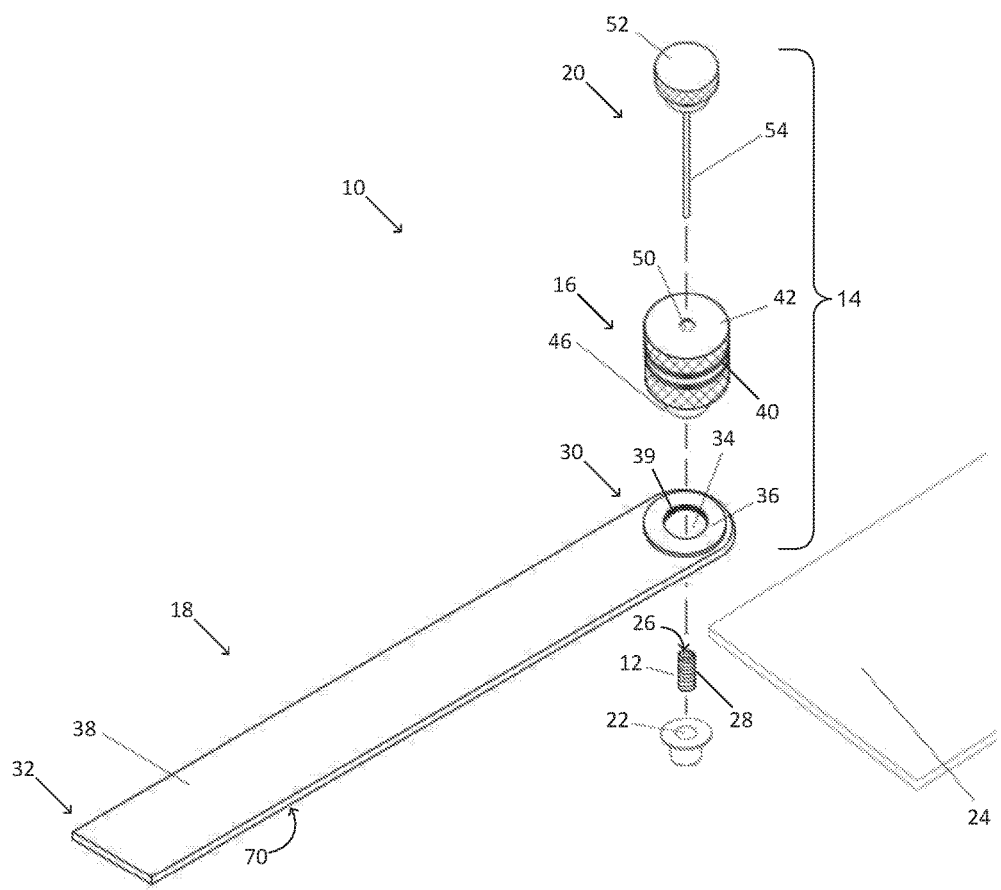
FIG. 1 is a perspective view illustrating one embodiment of a system or device for locating a blind hole in a first material, and for drilling a hole in a second material covering the first material.

FIG. 1 illustrates a blind hole locating device or system 10 according to one embodiment of the present disclosure. Device 10 includes a guide screw 12 and a drill guide apparatus 14 with a drill guide 16, a guide strap 18, and a guide pin 20. Device 10 can be used to locate a blind hole 22 arranged or defined in a first material (not shown), and assist a user in drilling a hole through a second, covering material 24 that aligns with blind hole 22. In one application, the first material is an airplane wing and the second material 24 is a workpiece configured to cover, and be coupled to, the airplane wing. In another example, the first material is a first workpiece and the second material 24 is a second workpiece configured to cover, and be coupled to, the first workpiece.

As shown in FIG. 1, guide screw 12 can have a diameter sized for insertion into blind hole 22, and define a guide screw opening 26 therein. Guide screw opening 26 can be circular, hexagonal, polygonal, or any other suitable cross-section. In some embodiments, guide screw 12 includes threading 28 around its outer diameter that is sized to engage threading (not shown) within blind hole 22 so that guide screw 12 can be inserted into blind hole 22 via twisting guide screw 12 to engage threading 28 with threading of blind hole 22. Such twisting may be completed by, for example, a hex key, an Allen wrench, a drill, or another coupling tool.

Referring now to the drill guide apparatus 14, guide strap 18 includes a substantially flat piece with a fore portion 30 and an aft portion 32. As shown in FIG. 1, guide strap 18 defines a guide strap opening 34 along fore portion 30. In some embodiments, guide strap 18 also includes a female connector formed by an elevated ring 36 that substantially surrounds guide strap opening 34. The elevated ring 36 extends outwardly and away from a top surface 38 of guide strap 18, and defines a ring opening 39 concentric with guide strap opening 34. The female connector of the guide strap 18 can engage with a male connector of drill guide 16, as further described below. It should be appreciated that guide strap 18 can define any structure suitable to allow a guide strap opening to be defined in the structure, and to allow the guide strap to be removably attached or coupled to the first material, as discussed below.

Figure 2:
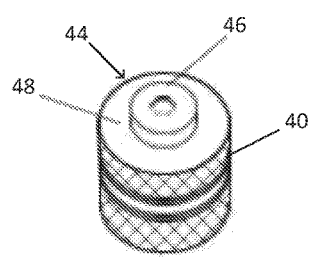
FIG. 2 is a perspective underside view illustrating an embodiment of a drill guide for the system or device of FIG. 1.

The drill guide 16 is structured to be removably attached or coupled to guide strap 18. For example, in one embodiment, drill guide 16 includes a body 40, a top side 42 (as shown in FIG. 1), and a bottom side 44 (as shown in FIG. 2), which includes a protrusion 46 and a rim 48. Protrusion 46 includes a ring-like shape or any other shape suitable to allow protrusion 46 to be inserted and removably coupled to guide strap 18. Drill guide 16 can include one or more of, for example, hardened steel, aluminum, or any other material suitable for removably coupling drill guide 16 to guide strap 18.

As shown in FIG. 2, protrusion 46 extends outwardly and away from the bottom side 44 of drill guide 16, while rim 48 surrounds a base of protrusion 46. Protrusion 46 and rim 48 therefore act as a male connector for drill guide 16 and are sized to matingly engage with a female connector of guide strap 18 (e.g., the elevated ring 36 and ring opening 39 of guide strap 18) so that guide strap 18 can be removably coupled or attached to drill guide 16. In other words, the male connector of drill guide 16 can be inserted into the ring opening 39 of guide strap 18 such that elevated ring 36 contacts or matingly engages with rim 48 of the drill guide 16. The male connector can be sized to protrude into ring opening 39 only, or into both ring opening 39 and guide strap opening 34. In alternative embodiments, the guide strap 18 does not include elevated ring 36, and protrusion 46 protrudes from the rim 48 and is sized so as to engage with guide strap opening 34. In each embodiment, the protrusion 46 may protrude into, but not completely through, guide strap opening 34.

It should be appreciated that other mechanisms may be used in addition to or as an alternative to the male/female engagement for achieving the removable coupling of drill guide 16 to guide strap 18. For example, in some embodiments, one or more portions of drill guide 16 and guide strap 18 can be magnetized or include a magnetic material that allows drill guide 16 to be magnetically coupled to guide strap 18. In one configuration, at least protrusion 46 and elevated ring 36 are magnetized. In another configuration, protrusion 46 and fore portion 30 of guide strap 18 are magnetized. In another embodiment, the male connector and the female connector are removably coupled to one another via mating grooves or threading (not shown) to achieve the removable coupling. In yet another example, the male connector and the female connector or other components of drill guide 16 and guide strap 18 can be adhered to each other. Other locking or coupling features are also contemplated by different embodiments.

Referring again to FIG. 1, drill guide 16 can also define a drill guide hole 50 that extends through the body 40. Drill guide hole 50 is arranged so that, when drill guide 16 is coupled to guide strap 18, drill guide hole 50 is centered or otherwise aligned with guide strap opening 34. Drill guide hole 50 can have a circular, hexagonal, polygonal, or any other suitable cross-section and be sized approximately equal to guide screw opening 26. For example, drill guide hole 50 (and guide screw opening 26) can approximately match a desired drill bit diameter. As a result, an operator can select a desired drill bit based upon the size of guide screw opening 26 or blind hole 22. The operator can also select a drill guide 16 having a drill guide hole 50 that is sized to match the selected drill bit size.

The guide pin 20 can likewise be sized to engage drill guide hole 50. More specifically, guide pin 20 can include a handle 52 and a pin portion 54. Pin portion 54 can include a diameter sized to be insertable through drill guide hole 50 and guide screw opening 26. Handle 52 can be integral with or coupled to pin portion 54 and can include a diameter larger than the diameter of pin portion 54. As a result, pin portion 54 can be inserted into drill guide hole 50 until handle 52 contacts the top side 42 of drill guide 16. Handle 52 thus provides an easy way for an operator to insert and remove guide pin 20 from drill guide hole 50. Pin portion 54 can also include a length so that, when drill guide 16 is coupled to guide strap 18 and pin portion 54 is inserted through drill guide hole 50, pin portion 54 extends into guide screw opening 26. Additionally, in some embodiments, pin portion 54 and/or handle 52 can be magnetic. As a result, pin portion 54 and/or handle 52 can engage magnetic parts of drill guide 16 and/or guide strap 18.

Figure 3:
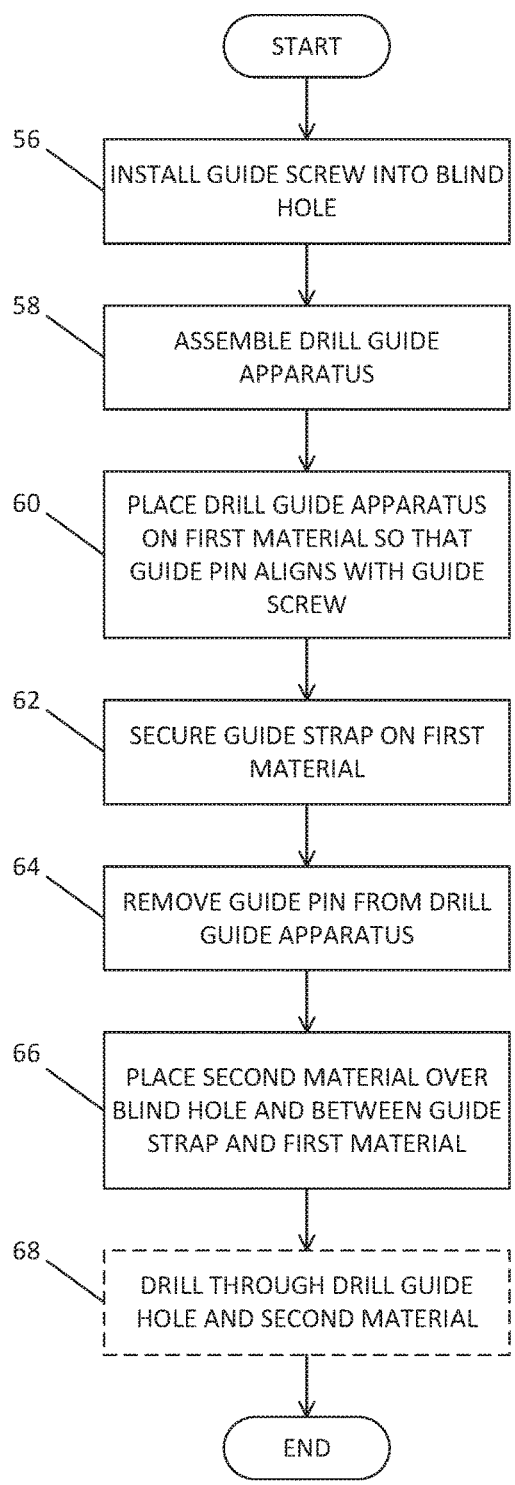
FIG. 3 is a flow chart illustrating one embodiment of a blind hole locating method according of the present disclosure.

FIG. 3 illustrates one embodiment of a method for using the above-described device 10 to precisely locate one or more blind holes 22 in a first material, and to efficiently drill holes into a second material 24 covering the first material. The method generally includes a first step 56 of installing the guide screw 12 into the blind hole 22 of the first material. Next, at step 58, the drill guide apparatus 14 is assembled by coupling the drill guide 16 to the guide strap 18 and inserting the guide pin 20 (more specifically, the pin portion 54 of the guide pin 20) through the drill guide hole 50 so that a length of the guide pin 20 protrudes past the guide strap 18. At step 60, the drill guide apparatus 14 is placed on the first material so that at least a portion of the length of the guide pin 20 protrudes into the guide screw 12 inside the blind hole 22. Once placed on the first material, at least a portion of the guide strap 18 is secured to the first material at step 62. While the guide strap 18 remains secured, the guide pin 20 is removed from the drill guide hole 50 at step 64. The second material 24 can then be placed over the blind hole 22 (including the guide screw 12 in the blind hole 22) and between the guide strap 18 and the first material at step 66. The method concludes with an optional step 68 of drilling through the drill guide hole 50 and the second material 24 until reaching the guide screw 12.

More specifically, at step 56, the guide screw 12 is installed into the blind hole 22 of the first material. This installation step can be achieved by, for example, inserting or threading the guide screw 12 into the blind hole 22, as described above.

At step 58, the drill guide apparatus 14 is assembled by coupling the drill guide 16 to the guide strap 18 and inserting the guide pin 20 through the drill guide hole 50 so that a length of the guide pin 20 protrudes past the guide strap 18. In some embodiments, as described above, the drill guide 16 can be magnetically coupled to the guide strap 18. Additionally, in some embodiments, the drill guide 16 can be removably coupled to the guide strap 18 by engaging the male connector (e.g., the protrusion 46) of the drill guide 16 with the female connector (e.g., the elevated ring 36) of the guide strap 18.

At step 60, the drill guide apparatus 14 is placed on the first material so that at least a portion of the length of the guide pin 20 protrudes into the guide screw 12 inside the blind hole 22. For example, the guide strap 18 is placed flat against a surface of the first material so that the guide strap opening 34 is aligned with and positioned over the blind hole 22. This positioning allows the guide pin 20, which extends past the guide strap opening 34, to protrude into the guide screw opening 26. In this manner, the guide pin 20 acts as a centering tool to ensure the drill guide hole 50 is aligned with the guide screw 12 and the blind hole 22.

At step 62, at least a portion of the guide strap 18 is secured to the first material. For example, the aft portion 32 of the guide strap 18 (which is located a distance away from the guide strap opening 34 and, thus, away from the blind hole 22) may be secured to the first material. More specifically, in one embodiment, the guide strap 18 may be secured by adhering the aft portion 32 to the first material, such as with tape, glue, or another adhering mechanism. In other embodiments, the guide strap 18 may be secured by other removable coupling methods or temporary coupling mechanisms.

At step 64, while the guide strap 18 remains secured, the guide pin 20 is removed from the drill guide hole 50. For example, an operator may use the handle 52 to lift the guide pin 20 out of the drill guide hole 50. Optionally, the drill guide 16 may also be removed or decoupled from the guide strap 18 at this step.

At step 66, the second material 24 can be placed over the blind hole 22 and the guide screw 12, and between the guide strap 18 and the first material. For example, the second material 24 can be slid between the guide strap 18 and the first material until the second material 24 is at a desired position covering the blind hole 22. Because the guide pin 20 has been removed at step 64, the second material 24 can be slid between the guide strap 18 and the first material without interruption (i.e., because no components of the device 10 protrude past a bottom surface 70 of the guide strap 18 adjacent the guide strap opening 34). Also, because the drill guide 16 does not protrude through the guide strap opening 34, the drill guide 16 may remain coupled to the guide strap 18 during this step. Additionally, because the guide strap 18 is secured to the first material away from the blind hole 22, sliding the second material 24 between the guide strap 18 and the first material to cover the blind hole 22 does not affect the secured position of the guide strap 18. In other words, the guide strap 18 does not need to be bent or substantially moved in order to arrange the second material 24 over the blind hole 22.

Following step 66, the blind hole 22 is covered by the second material 24 and, thus, hidden. However, because the guide strap 18 is still secured to the first material, the guide strap opening 34 indicates the location of the blind hole 22. If the drill guide 16 was removed at step 64, the drill guide 16 may be recoupled to the guide strap 18 at this point. With the drill guide 16 coupled to the guide strap 18, the drill guide hole 50 can provide the precise location of the blind hole 22 with minimal to zero deviation. More specifically, the male connector of the drill guide 16 can engage with the female connector of the guide strap 18 to ensure repeatable alignment after repeated removal and recoupling of the drill guide 16 from the guide strap 18.

Accordingly, at optional step 68, an operator can drill through the drill guide hole 50 of the drill guide 16 and through the second material 24 until reaching the guide screw opening 26 in the blind hole 22. Once step 68 is completed, the second material 24 will have a drilled hole that precisely aligns with the blind hole 22. The operator can then place a fastener through the coaxial drilled hole and blind hole 22 to couple the second material 24 to the first material.

In some embodiments, multiple guide screws, guide straps, drill guides, and/or guide pins can be provided in a kit so that multiple holes can be located and drilled at one time according to the above method. For example, multiple guide screws can be used with one or more drill guide apparatuses. In other example, multiple guide screws and guide straps can be used with one or more drill guides and guide pins. In yet another example, multiple guide screws, guide straps, and drill guides can be used with one or more guide pins.

One application in which the above-described device 10 and method can be used is aircraft wing manufacturing. For example, an aircraft wing (i.e., a first material) may include one or more blind holes. Another workpiece (i.e., a second material) that needs to be coupled or secured to the aircraft wing may not include predrilled holes. The above device 10 and method can thus be used to arrange the workpiece over the aircraft wing, and to drill one or more holes in the workpiece that align precisely with one or more blind holes in the aircraft wing. Once the new holes are drilled, fasteners can be inserted into the drilled holes and the aligned blind holes to couple or secure the workpiece to the aircraft wing. Additionally, because the drill guide apparatus 14 can be easily realigned with a new blind hole and the guide strap 18 resecured to the airplane wing, multiple drill holes can be aligned along the workpiece quickly and with ease compared to existing blind hole locating devices. Furthermore, because the guide strap 18 is a single strap configured to lie against a surface of the airplane wing (or other first material), the device 10 can be easily used regardless of a thickness or blind hole placement relative to an edge of the airplane wing or the workpiece. It should be appreciated that in various embodiments, multiple guide straps and multiple drill guides, screws, and guide pins could be used to carry out the methods and devices described herein.

What is claimed is:

1. A blind hole locating method comprising:
   a) installing a guide screw into the blind hole of a first material;
   b) assembling a drill guide apparatus including:
      coupling a drill guide to a guide strap, and
      inserting a guide pin through a drill guide hole defined in the drill guide so that a length of the guide pin protrudes past the guide strap;
   c) placing the drill guide apparatus on the first material so that at least a portion of the length of the guide pin protrudes into the guide screw;
   d) securing a portion of the guide strap to the first material;
   e) removing the guide pin while the portion of the guide strap is secured to the first material; and
   f) placing a second material (i) over the blind hole and the guide screw that is inserted in the blind hole and (ii) between the guide strap and the first material.

2. The blind hole locating method of claim 1, wherein said coupling the drill guide to the guide strap of b) includes magnetically coupling the drill guide to the guide strap.

3. The blind hole locating method of claim 1, wherein said coupling the drill guide to the guide strap of b) includes engaging a male connector of the drill guide with a female connector of the guide strap.

4. The blind hole locating method of claim 1, which includes removing the drill guide from the guide strap while the portion of the guide strap is secured to the first material.

5. The blind hole locating method of claim 4, which includes g) recoupling the drill guide to the guide strap.

6. The blind hole locating method of claim 1, wherein said placing the second material between the guide strap and the first material of f) includes sliding the second material between the guide strap and the first material.

7. The blind hole locating method of claim 1, wherein the portion of the guide strap includes an aft portion of the guide strap located a distance from the blind hole.

8. The blind hole locating method of claim 1, which includes g) drilling through the drill hole and the second material until reaching the guide screw.

9. The blind hole locating method of claim 1, wherein d) includes adhering the portion of the guide strap to the first material.

10. The blind hole locating method of claim 1, wherein the first material is an airplane wing.

11. A blind hole locating device comprising:
- a guide screw having a diameter sized for insertion into a blind hole, the guide screw defining a guide screw opening;
- a guide strap defining a guide strap opening;
- a drill guide structured to be removably coupled to the guide strap, the drill guide defining a drill guide hole arranged such that when the drill guide is coupled to the guide strap, the drill guide hole is aligned with the guide strap opening; and
- a guide pin including (i) a diameter sized to be insertable through the drill guide hole and the guide strap opening, and (ii) a length such that when the drill guide is coupled to the guide strap and the guide pin is inserted through the guide hole and the guide strap opening, the guide pin extends into the guide screw opening.

12. The blind hole locating device of claim 11, wherein the drill guide is structured to be removably coupled to the guide strap via a magnetic coupling.

13. The blind hole locating device of claim 11, wherein the drill guide includes a male connector insertable into the guide strap opening of the guide strap.

14. The blind hole locating device of claim 11, wherein the drill guide includes a male connector insertable into a female connector of the guide strap, the female connector surrounding the guide strap opening.

15. The blind hole locating device of claim 14, wherein the male connector and the female connector include magnetic material.

16. The blind hole locating device of claim 14, wherein the female connector (i) defines a ring opening concentric with the guide strap opening and (ii) includes an elevated ring that matingly engages with a rim of the drill guide.

17. The blind hole locating device of claim 16, wherein the mating engagement includes a magnetic engagement.

18. The blind hole locating device of claim 11, wherein the guide pin includes a handle.

19. The blind hole locating device of claim 11, wherein the drill guide hole includes a diameter sized to engage with a diameter of the guide screw opening.

20. The blind hole locating device of claim 11, wherein the guide screw includes outer threading structured to engage with the blind hole.

* * * * *